United States Patent Office 2,762,065
Patented Sept. 11, 1956

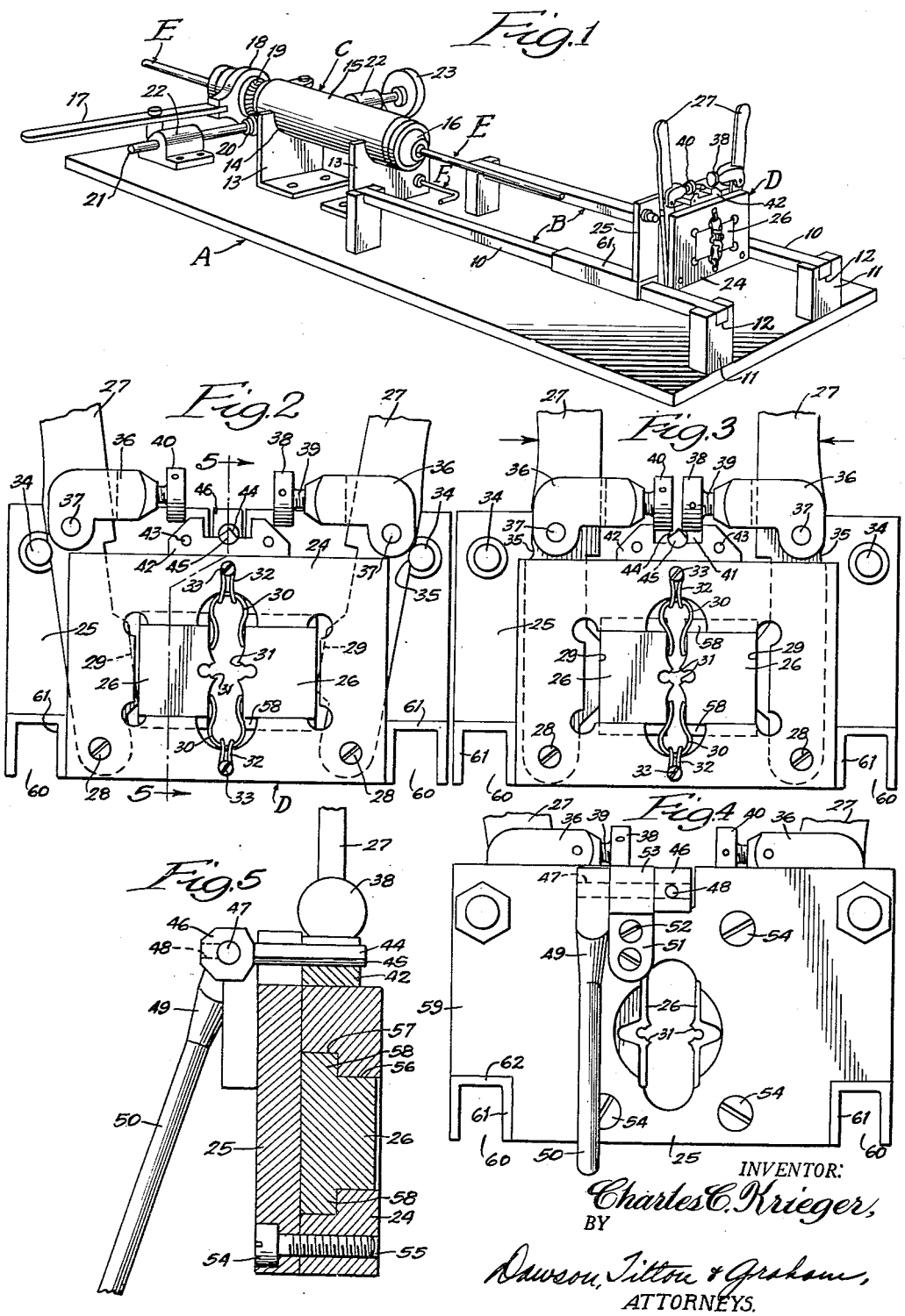

2,762,065

SEPARATE LEVER OPERATED MEANS FOR OPENING AND CLOSING THE CHASERS ON A DIE HEAD

Charles C. Krieger, Chicago, Ill., assignor of one-half to Marie M. Krieger, Chicago, Ill.

Application May 6, 1953, Serial No. 353,275

10 Claims. (Cl. 10—97)

This invention relates to thread cutting aparatus and, more particularly, to automatic apparatus for cutting threads on cylindrical tubes, shafts, or other cylindrical members.

An object of the invention is to provide thread cutting apparatus in which the die head advances automatically along a track as the threads are being cut in a shaft or similar member.

Another object of the invention is to provide thread cutting apparatus in which the thread cutting operation is automatically terminated at a pre-selected position along the member having threads formed thereon. Still another object is to provide automatic thread cutting apparatus in which the die head advances automatically along a track member as threads are being formed upon a member and in which adjustable stop means are provided so that the thread cutting operation may be terminated at a pre-selected point relative to the member having threads formed thereon.

Yet another object is in providing a die head that is adapted to support partible dies and in which the dies may be manually closed upon a member to start the thread cutting operation. A further object is in providing a die head in which partible dies are slidably supported therein and means are provided for manually closing the dies to commence a thread cutting operation and in which the dies are automatically held in closed position after being manually moved thereto.

Yet a further object of the invention is to provide automatic apparatus for forming threads on cylindrical shafts, tubes and the like, and in which the die head is manually brought into engagement with the end of the member to have threads formed thereon and the partible dies carried by the die head are manually closed to engage the end of the member; the die head being advanced automatically along a track member as the threads are being formed and in which stop means and a release arrangement cooperate to open the dies carried by the head at a pre-selected position.

Additional objects and advantages will appear as the specification proceeds.

An embodiment of the invention is illustrated in the accompanying drawings, in which:

Fig. 1 is a perspective view of the automatic thread cutting apparatus;

Fig. 2 is an enlarged front view in elevation of the die head in which the partible dies are in open position;

Fig. 3 is an enlarged front view in elevation, similar to that of Fig. 2, but in which the dies are in closed position;

Fig. 4 is a rear view in elevation; and

Fig. 5 is a vertical, sectional view, taken on the line 5—5 of Fig. 2.

The automatic thread cutting apparatus illustrated in perspective in Fig. 1 includes a bed or table A, having a track B, mounted thereon, chuck means C supported upon the bed A in longitudinal alignment with the track B, and a die head D, slidably mounted upon the track B. Also illustrated in Fig. 1 is a member E that is supported within the chuck means C and may be a shaft or tube or other cylindrical member upon which the threads will be formed during the cutting operation. An adjustable stop member F is mounted below the member E and cooperates with the die head D to release or open the dies to terminate the thread cutting operation at a pre-selected point along the member E.

The base or table A may be formed by any substantially rigid member and may be a separate piece, as is illustrated in Fig. 1 or may be the top of a table or bench or other stable member. The track B mounted upon the plate or base A comprises a pair of elongated, rectangular runners 10 that are spaced apart and extend in parallel relation along the base A. The runners 10 are supported at each end upon blocks 11, rigidly secured to the plate A, and equipped at their upper end with rectangular recesses 12 that snugly receive the ends of the rectangular runners 10.

The chuck means C is rigidly carried on the plate A in longitudinal alignment with the runners 10. The chuck means C includes a pair of generally L-shaped mounting brackets 13 that may be secured to the plate A by welding or by cap screws, etc., and at their upper ends the brackets 13 provide an arcuate recess 14 therein that snugly receive the cylindrical casing 15 of the chuck. The casing 15 may be rigidly secured to the L-shaped brackets 13 by welding or other suitable means.

Any suitable chuck arrangements may be employed and since such members are conventional and well known in the art it is believed unnecessary to set out in detail the structure of such apparatus. To facilitate understanding of the invention, however, it may be said that the chuck means C includes a chuck 16, rotatably mounted within the casing 15 that is equipped with means for opening and closing the chuck so that a member can be inserted and removed from the jaws of the chuck. Preferably, the chuck jaws are adjustable so that members E, having varying diameters, may be supported rigidly therein. To open and close the jaws of the chuck 16, the lever 17 is provided, which is operatively arranged with the jaws of the chuck through a clamping device 18. The chuck 16 is equipped with a gear 19, rotatably driven by a worm gear 20, rigidly carried on an elongated shaft 21, journaled at each end in bearing members 22 rigidly supported upon the base A. At one end the shaft 21 is equipped with a pulley wheel 23 which is adapted to receive a V-shaped pulley belt, which is not shown. A conventional motor arrangement may be provided to drive the pulley wheel 23 through a suitable belt.

The stop member F is supported within the forward bracket 13 and is preferably adjustable, so that it may be moved longitudinally of the track B and thereby relative to a member E supported in the jaws of the chuck. Any of the well known mounting arrangements may be used to provide an adjustable support for the stop member F.

The die holder D includes a pair of plates 24 and 25 that provide together a channel or guide for slidably supporting a pair of dies 26. As can be seen best in Figures 2 and 3, a pair of levers 27 are pivotally mounted upon pivot pins 28 within end slots provided by the plate 24. Preferably, the pivot pins 28 extend through the plate member 24 and are threadedly received within appropriate apertures within the plate 25. The levers 27 extend upwardly and above the plates and are adapted to be gripped by the hands and moved toward each other, Each of the levers 27 is equipped with an inwardly extending portion 29 that engages the outer edge of the die members 26. Normally, the die members 26 are biased by U-shaped springs 30 in an outward direction and therefore force the upper ends of the levers 27 into spaced apart relation. Squeezing together the levers 27 is operative to move the dies 26 against the biasing action of the springs and into position where the thread cutting portion 31 of the dies is adapted to receive and form threads on a tubular member E. The U-shaped spring members 30 are held in place between the partible die members 31 by clips 32 secured to the plate 24 by cap screws 33 threadedly received within the plate 24. The stop members 34 carried by the plate 25 limit the outward movement of the levers 27. If desired, the stops 34 may be arcuate and the levers 27 provided with complementary arcuate recesses 35 adapted to receive the stop members 34 therein.

Each of the levers 27 has pivotally mounted thereon on above the upper surface of the plate 24 a pivotal finger 36, pivotally mounted upon a pin 37 extending through the lever 27 and through the bifurcated end of the finger 36. At their inner ends the fingers 36 are provided with cylindrical locking members 38 that are preferably equipped with a threaded shaft 39 that is threadedly received within bores provided in the inner end of the fingers 36. The locking members 38 can thereby be adjusted relative to the fingers 36. If desired, the lock members may be equipped with one or more openings 40 about the periphery thereof that is adapted to receive an Allen wrench or other similar tool for turning the member within the threaded bore provided by each of the fingers 36.

The locking members 38 are adapted to be received within a central recess 41 provided by a latch member 42 that rests upon the upper surface of the plate 24 and may be secured to the plate 25 by pins or cap screws 43. As will be seen best in Figs. 4 and 5, a cam 44 is received within a shallow recess 45 provided in the member 42 and within the central recess or channel 41 provided thereby and is equipped at its forward end with a hub 46 having a central opening therethrough that receives an axle 47 therein. The axle 47 is locked within the hub 46 by a set screw 48. At its opposite end the axle 47 carries a lever or trip member 49 that is rigidly secured to the shaft by any well known and appropriate means and has a stop engaging portion 50 depending from the axle 47. The cam, axle and trip member structure described are supported by a support member or track 51 that is secured to the plate 25 by cap screws 52. At its upper end the bracket or support 51 is equipped with a bearing 53 that has journaled therein the central portion of the axle 47. It will be apparent from an inspection of Fig. 5 that by moving the trip member 49 inwardly toward the plate 25 that the forward end of the cam 44 will be raised and will engage the locking fingers 38 if they are received within the central channel 41 of the member 42.

It will be seen in Fig. 5 that the plates 24 and 25 are secured together by a plurality of cap screws 54 that extend through the plate 25 and are threadedly received within bores 55, provided by the plate 24. The plate 24 is also equipped with a central opening 56 therein that is preferably rectangular and approximately as large as the die members 26. The plate 24 also has along the top and bottom edges of the opening 56 a channel or recess 57 that provides a track or guideway for the die members 26. It will be noted that each of the die members 26 is provided with a shoulder 58 along each side thereof that extends into the channel 57 and is slidably movable therein.

The plate 25 is somewhat larger than the plate 24 and has along each side thereof outwardly extending portions 59. The outwardly extending portions 59 terminate short of the bottom edge of the plate 24 and provide a notch 60 that receives elongated bushings 61 therein that are generally U-shaped and conform to the contour of the runners 10 and are slidably received thereon. The bushings 61 are rigidly secured to the plate 25 by cap screws or welding or by other means that will provide a rigid joint and preferably the plate 25, adjacent the notched corners 60, is equipped with a recess 62 that provides a shoulder against which the end of the bushing 61 may abut. The shoulder provided by the recess facilitates the mounting of the bushing upon the plate and adds to the rigidity of the mounting thereon.

*Operation*

In operation, the die holder D, which has been equipped with the bushings 61, is mounted upon the runners 10 provided by the track B. The die holder D is a lightweight structure and includes only the operative parts necessary to secure and release the die members 26 about a cylindrical member E that is to have threads cut thereon. Appropriately, the bushings 61 and track B may be lubricated to facilitate sliding movement of the die holder on the track. A member E is secured in the jaws of the chuck and after it has been determined that the threads should be cut to some pre-selected distance along the member E, the adjustable stop F is adjusted longitudinally until the laterally turned bumper portion thereof is in vertical alignment with the point along the member E at which the threads should terminate. The driving means for the chuck are then actuated and the pulley wheel 23 is rotated to drive the worm 20, gear 19 and thereby the chuck 16 and member E carried thereby.

It is assumed that die members 26 of the appropriate size have been mounted within the die holder D and the die holder D is then moved forwardly along the track B until the thread cutting portion 31 of the die members is adjacent the end of the cylindrical member E. The operator then grips the levers 27 and squeezes them inwardly to draw the die members 26 together. When the levers are drawn together, the lock fingers 38 slide upwardly and over the beveled edges of the member 41 and drop into the central channel 41 provided by this member. It is noted that the cam 44 normally lies within the shallow recess 45 provided centrally in the channel 41 and offers no obstruction to the fingers 38 as they drop into the recess or channel 41. Fig. 3 illustrates the fingers 38 after the levers 27 have been moved together and the fingers have thereby been dropped into the central channel 41. The operator may release his grip on the levers 27 and the locking fingers 38 will remain within the channel 41 and the die members 26 will be held in operative position.

Generally, it is necessary for the operator to urge the die holder D forwardly as the initial threads are being cut upon the end of the member E. The force necessary to urge the die holder D forwardly need only be that amount that is necessary to overcome the frictional force between the bushings 61 and the track B. After the first two or three threads have been cut on the member E, the operator may completely disassociate himself from the apparatus, for the die holder D will be drawn forwardly automatically as the threads are being cut on the member E.

As the threads are being cut and the die holder D moves forwardly along the cylindrical member E, the die member approaches the point at which the cutting operation should terminate and therefore the trip lever 49 approaches the adjustable stop member F. Eventually, in the cutting operation the trip lever 49 and the depending portion 50 thereof will engage the laterally turned portion of the stop member F and as the die holder continues to advance, the trip lever 49 will be forced inwardly and against the plate 25 by the stop member. Since the trip 49 is secured to the axle 47 and the axle, in turn, is secured to the cam 44, the forward end of the cam will be raised and it will engage the locking fingers 38, which are at this time positioned within the central locking channel 41. As the cam rises, it will force the fingers 38 upwardly until they are clear of the side edges of the channel 41 and the spring members 30 will then be operative to force the dies 26 outwardly, and the movement of the dies, of course, will force the levers 27 outwardly and into engagement with the stop pins 34 that are carried by the plate 25. It is apparent that this action is entirely automatic and requires no attention from the operator of the apparatus.

Preferably, the chuck 16 has a longitudinally extending opening therethrough, so that a fairly long pipe or tube or other member E may be mounted within the chuck and a portion thereof can extend outwardly and rearwardly of the chuck. With such an arrangement, substantially the entire length of a very long tube can be equipped with threads without the necessity of releasing and re-engaging the dies 26 with the member E after certain portions or certain lengths of threads have been formed thereon. All that is necessary when such a chuck is provided is to disengage the jaws of the chuck from the member E when the die holder D approaches the stop F and then slide the die member D rearwardly along the track B, and since the dies 26 are in cutting engagement with the peripheral surface of the member E, the member will be carried along with the die holder D and it will slide axially through the chuck and the jaws thereof. When the die holder D has been moved to a position adjacent the end of the track B, the lever 17 is then manipulated to tighten the jaws of the chuck about the member E and the threading operation continues. This procedure may be repeated as often as may be necessary and until threads have been cut on substantially the entire surface of the tube or member E.

Dies 26 of the appropriate size are readily mounted within the die holder D by simply removing the four cap screws 54 (one of the cap screws which are seen best in Fig. 4 is hidden beneath the trip lever 49) and separating the plates 24 and 25. The dies 26 may then be withdrawn from the plate 24 and replaced with other dies.

If desired, a spring may be interposed between the trip lever 49 and the plate 25 to insure that the cam 44 is normally within the shallow groove or recess 45 provided by the member 42. This has not been found necessary, however, since the cam and lever arrangement may be balanced so that the cam is normally within the recess 45.

The lightweight die holder D is easily moved along the track B and is automatically carried forward during the cutting operation and after the initial two or three threads have been formed on the member E. The levers 27 of the die holder are easily manipulated to move the locking fingers 38 into locking engagement with the walls of the locking recess or channel 41 and the dies 26 may be easily aligned with a member E supported in the chuck means by rotating the locking fingers 38 to move them farther into the pivoting fingers 36 or to withdraw them therefrom, as the case may be, in order that the dies 26 will be moved inwardly the required amount and to the precise position that is necessary to effectuate proper cutting of the threads.

While in the foregoing specification an embodiment of the invention has been set out in considerable detail, for purposes of illustration, it will be apparent to those skilled in the art that considerable change may be made in these details without departing from the spirit and principles of the invention.

I claim:

1. A die holder, comprising plate means provided with an enlarged opening extending transversely therethrough, said plate means defining a guide for carrying a pair of thread cutting dies for movement between open position and closed position in general alignment with said opening, a pair of spaced-apart levers pivotally carried by said plate means about axes substantially normal to the path of movement of such dies for engagement with dies carried in said guide to move the same into closed position, a lock carried by said plate means and locking fingers carried by said levers for free movement relative thereto, means urging said locking fingers toward said lock whereby they are automatically movable into interlocking engagement with said lock when said levers are moved so as to close a pair of thread cutting dies with the result that the dies are thereby locked in closed position, and means for selectively releasing said fingers when interlockingly engaged with said lock.

2. The die holder of claim 1 in which said last mentioned means comprises pin means movably carried by said plate means and engageable with said locking fingers when in interlocked relation with said lock to release the same therefrom.

3. The structure of claim 1 in which said lock is provided with a channel, and in which said locking fingers are equipped with flange members receivable within said channel when said levers are in die closing position.

4. The structure of claim 3 in which said flange members are adjustable to enable the extent of closing of die members moved by said levers to be preselected.

5. In a die holder adapted for use in thread cutting apparatus having a track for slidably supporting the die holder thereon and having means for supporting and rotating a work member for operative engagement with thread cutting dies carried by the die holder, support plates providing a guide for carrying a pair of thread cutting dies therein for opening and closing movement away from and toward each other respectively, a pair of levers carried by said plates for movement generally along the line of movement of said dies and for respective engagement therewith to force the same into closed position, locking fingers carried by said levers for free pivotal movement relative thereto about axes disposed in planes substantially normal to the plane defined by movement of such dies, each of said locking fingers being provided with a laterally extending lock member, a lock secured to said plates and having a channel therein alignable with said lock members for receiving the same therein when said levers are moved to close such a pair of dies, said locking fingers being biased to automatically insert said lock members within said channel when said levers are moved to die closing position, and means biasing said dies toward open position.

6. The apparatus of claim 5 in which said channel has an open top and said locking fingers are gravity biased so that said lock members drop into said channel when aligned therewith.

7. The structure of claim 6 in which a cam pin extends into said channel and is carried for pivotal movement by said plates, said cam pin being engageable with said lock members when within said channel to raise the same therefrom for releasing said levers.

8. The structure of claim 7 in which said cam pin is provided with an arm adapted to engage a stop provided along the track of the thread cutting apparatus, said arm upon engagement with said stop being operative to move said cam pin into engagement with said lock members to release the same from said channel.

9. A die holder, comprising a pair of plates providing a guide therebetween, a pair of partible dies slidably mounted in said guide for movement between open and closed positions, a pair of levers pivotally carried by said plates in alignment with said dies about axes generally normal to the direction of movement of the dies for engagement therewith upon pivotal movement to force the same into closed position, spring means normally biasing said dies into open position, a locking finger for each of said levers and being pivotally mounted thereon about axes substantially parallel to the pivotal axes thereof, a lock member provided with a channel adapted to receive said locking fingers therein when said levers are moved into die-closing position for securing said levers in such position, cam means for releasing said fingers from said channel, and means urging said locking fingers toward said channel whereby the locking fingers are automatically movable into said channel when said levers are in die-closing position.

10. The die holder of claim 9 in which said cam means includes a cam movable within said channel to engage said locking fingers when received therein, and a trip lever connected with said cam for moving, when actuated, the cam into engagement with said locking fingers to urge the same out of said channel.

References Cited in the file of this patent

UNITED STATES PATENTS

| | | |
|---|---|---|
| 633,473 | Nienstaedt | Sept. 19, 1899 |
| 2,357,739 | Heckman | Sept. 5, 1944 |